United States Patent [19]

Kanai et al.

[11] Patent Number: 4,694,571
[45] Date of Patent: Sep. 22, 1987

[54] APPARATUS FOR AUTOMATICALLY CHANGING X-RAY FILMS

[75] Inventors: Hideo Kanai, Gunma; Toshinori Komba, Tokyo; Eiji Mogi, Kanagawa, all of Japan

[73] Assignee: Nagase Medical Supply Co., Ltd., Osaka, Japan

[21] Appl. No.: 846,049

[22] Filed: Mar. 31, 1986

[30] Foreign Application Priority Data

Apr. 2, 1985 [JP] Japan .............................. 60-49080[U]

[51] Int. Cl.$^4$ ........................ B23P 19/00; B23P 21/00
[52] U.S. Cl. ......................................... 29/806; 29/709
[58] Field of Search ................................... 29/806, 709

[56] References Cited

U.S. PATENT DOCUMENTS

| | | | |
|---|---|---|---|
| 3,829,947 | 8/1974 | Nakamura et al. | 29/806 |
| 3,857,153 | 12/1974 | Takiguchi et al. | 29/806 |
| 4,527,320 | 7/1985 | Deconinck | 29/806 |
| 4,541,173 | 9/1985 | Sakuma et al. | 29/806 |

Primary Examiner—Howard N. Goldberg
Assistant Examiner—Steven Nichols
Attorney, Agent, or Firm—Wenderoth, Lind & Ponack

[57] ABSTRACT

A film changing apparatus automatically replaces an exposed X-ray film accommodated in a cassette with a new or unexposed X-ray film. Unloading and loading of a film is effected in the vertical direction. Thus, the apparatus saves space in the horizontal direction. Furthermore, unloading of a film from the cassette is effected by gravity, thereby simplifying the structure of the mechanism for changing films, and thus allowing the size of the apparatus to be reduced as a whole.

4 Claims, 8 Drawing Figures

APPARATUS FOR AUTOMATICALLY CHANGING X-RAY FILMS

BACKGROUND OF THE INVENTION

1. Field of the Invention

The present invention relates to an apparatus for automatically changing X-ray films. More particularly, the present invention pertains to an apparatus for automatically replacing an exposed X-ray film accommodated in a cassette with a new or unexposed X-ray film.

2. Description of the Related Art

Films for use in X-ray recording are generally accommodated singly in a flat cassette in order to avoid exposure to ambient light, and are transported and loaded into an X-ray machine in this accommodated state. The cassette generally contains sensitizing paper for the purpose of intensifying the sensitivity of the film.

During examination of a patient, an X-ray machine often needs to be moved to an appropriate position so that an X-ray photograph of the patient can be taken, for example, in a case where the patient should not be moved. In such a case, a cassette which contains a film must be carried to the place where the X-ray machine is set, and after this film has been exposed, the cassette needs to be transported to a film changing apparatus for replacing the exposed film with a new or unexposed film. Although the film itself is relatively light in weight, the cassette is bulky and heavy. Therefore, it is not easy to transport a large number of cassettes at one time. Accordingly, there is a demand for facilitating such an X-ray film handling operation.

To meet this demand, the film changing apparatus needs to be made movable so that it is possible to move it together with an X-ray machine, and it should be possible for X-ray films to be carried in the film changing apparatus and each loaded into a cassette on the actual X-ray recording spot by using the apparatus, thereby reducing the number of cassettes required.

For this reason, a compact automatic film changing apparatus is in demand. Conventional film changing apparatuses, however, occupy an unfavorably large space in the horizontal direction because of the arrangement whereby a cassette is horizontally inserted into the apparatus, and the film is taken out of the cassette also in the horizontal direction. In addition, a typical conventional mechanism for changing films needs to perform both the function of unloading an exposed film from the cassette and the function of loading an unexposed film into the cassette, and to perform these functions a complicated structure of the mechanism is required. Accordingly, it has heretofore been impossible to realize a compact film changing apparatus which satisfies the aforementioned requirements.

SUMMARY OF THE INVENTION

In view of the above-described circumstances, it is a primary object of the present invention to provide an automatic X-ray film changing apparatus which has a simplified film changing mechanism and a reduced overall size.

To this end, the present invention provides an automatic X-ray film changing apparatus in which a cassette accommodating section and a film accommodating section are disposed one above the other, thereby reducing the space which is occupied by the apparatus in the horizontal direction, and in which unloading of a film from the cassette is effected by gravity, thereby simplifying the structure of the mechanism for changing films, and thus allowing the size of the apparatus to be reduced as a whole.

The above and other objects, features and advantages of the present invention will become more apparent from the following description of the preferred embodiment thereof, taken in conjunction with the accompanying drawings.

DESCRIPTION OF THE PREFERRED EMBODIMENT

The present invention will be described hereinafter in detail by way of one embodiment thereof with reference to the accompanying drawings.

Figure 1:
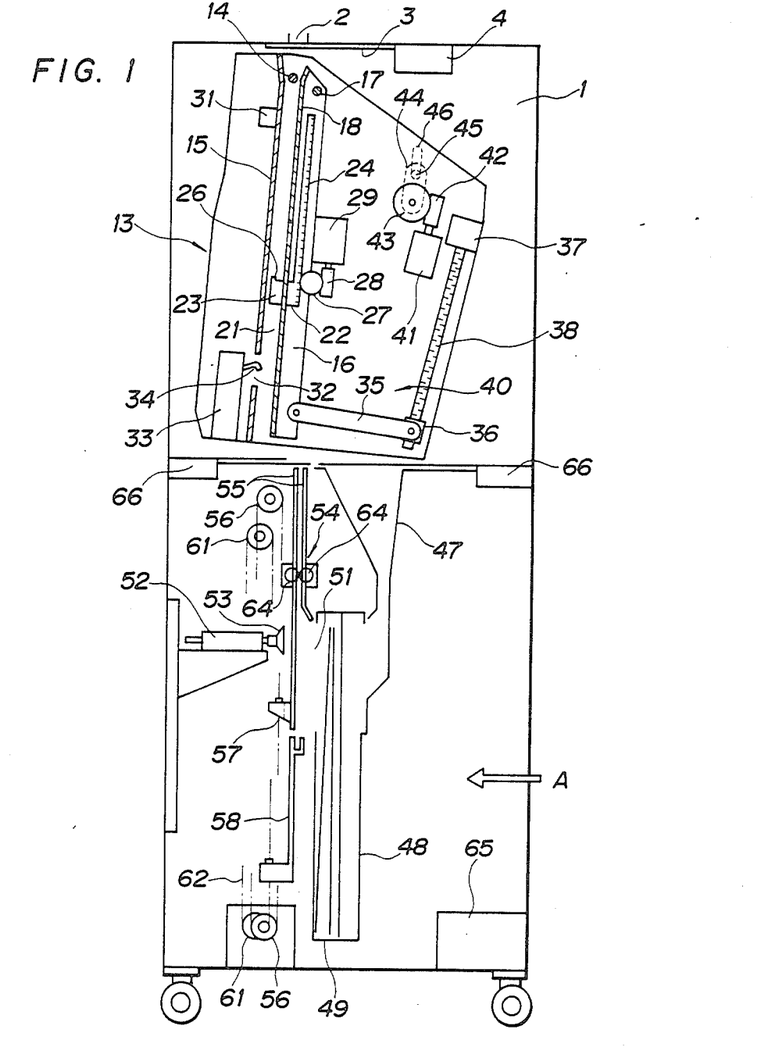
FIG. 1 is a vertical sectional side view of an automatic X-ray film changing apparatus in accordance with one embodiment of the present invention.

FIG. 1 is a vertical sectional side view of an automatic X-ray film changing apparatus in accordance with one embodiment of the present invention.

In FIG. 1, a housing 1 has at the top thereof a slot 2 through which a cassette is inserted into the housing. The slot 2 is opened and closed by a shutter 3 which is moved by an actuator 4 of any desired type. The arrangement is such that, after a cassette has been inserted into the housing 1, the shutter 3 closes the slot 2, thereby preventing the intrusion of ambient light into the housing 1. The shutter 3, which is operated by an actuator, is not necessarily limitative, and may be constituted by a rubber sheet which allows the passage of a cassette and which, after the cassette has passed, returns to its previous position by virtue of its resilience so as to block out ambient light.

Figure 2:
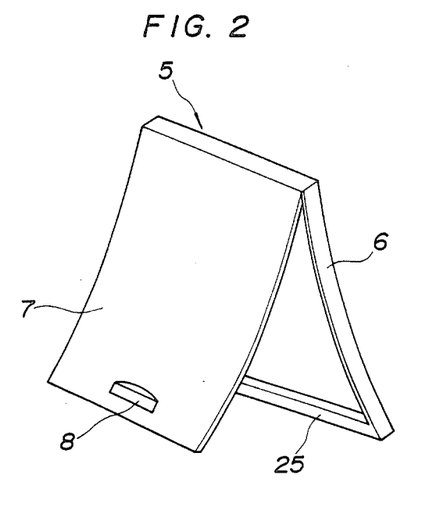
FIG. 2 is a perspective view of one example of a film cassette which may be employed in the present invention.
Figure 3:
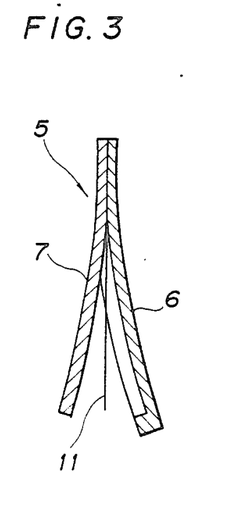
FIG. 3 is a sectional view of the cassette shown in FIG. 2.
Figure 4:
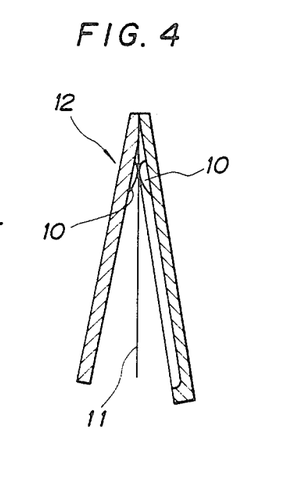
FIG. 4 is a sectional view of another example of the film cassette.

FIG. 2 shows one example of a cassette 5 which is to be inserted into the slot 2. The cassette 5 is composed of two halves 6 and 7 which are hinged together, the half 6 constituting the body of the cassette 5, and the half 7 constituting the lid of the cassette. Both the halves 6 and 7 are curved convexly toward each other but, when the cassette 5 is closed, they are elastically deformed so as to be flat. The halves 6 and 7 are provided with a known latch (not shown), whereby it is possible to maintain the halves 6 and 7 in a closed state. The half 7 is provided with a latch knob 8, so that the half 7 which serves as a lid can be opened by pulling the latch knob 8. The cassette 5 designed as described above has the advantage that, when a film 11 is to be sandwiched between the halves 6 and 7, the cassette 5 is able to clamp the film 11 solely at the upper portion thereof, i.e., at a portion of the film 11 which is closer to the hinge as shown in FIG. 3 before the cassette 5 is closed completely. This advantageous feature of the cassette 5 is essential to the present invention as described later. However, the practical way in which the above-described function may be provided is not necessarily limited to that shown in FIGS. 2 and 3, and various arrangements or structures may be employed. For example, as shown in FIG. 4, elastically deformable slips 10 may be provided adjacent to the hinge of a cassette 1 constituted by two flat halves.

Referring back to FIG. 1, a cassette supporting means 13 is provided within the housing 1 in such a manner as to be able to pivot about a pin 14. A cassette guide wall 15 is secured to the supporting means 13, and a movable guide member 16 is provided on the supporting means 13 so as to be able to pivot about a pin 17. The movable guide member 16 has a cassette guide wall 18. The guide walls 15 and 18 define in combination a cassette accommodating passage 21 when they are in a state such as that shown in FIG. 1. The movable guide member 16 is provided with a cassette gripping member 22 in that is is movable vertically. The gripping member 22 has a gripping portion 23 and a rack portion 24, the gripping portion 23 extending through a slot (not shown) which is extends through the center of the guide wall 18 vertically. The gripping portion 23 is provided at the distal end thereof with a pawl 26 which is engageable with the front wall 25 (see FIG. 2) of the lower edge of the half 6 of the cassette 5 which serves as the body thereof. The rack portion 24 is connected to a motor 29 through a worm wheel 27 and a worm 28, so that the gripping member 22 is moved up and down in response to the rotation of the motor 29.

A sensor 31 is provided adjacent to the guide wall 15, the sensor 31 being adapted to sense the passage of the cassette 5. The sensor 31 may be any desired sensor means, such as a microswitch or a photoelectric device. An opening 32 is provided in the lower end portion of the guide wall 15 through which for a pawl 34 of an unlatching means 33 passes and extends into the cassette accommodating passage 21. The pawl 34 engages, when the unlatching means 33 is activated, with the latch knob 8 of the cassette 5 so as to unlatch it in order to allow the cassette 5 to be opened, and at the same time, the pawl 34 retains the half 7 of the cassette 5 on the guide wall 15. However, a mechanism for retaining the half 7 may be additionally provided independently of the pawl 34 for unlatching the cassette 5. In addition, the unlatching means 33 may be omitted in the case of a type of cassette which is so designed that the closed state thereof is maintained by means of friction or the like, rather than by the latch.

A lever 35 is pivotally connected to the movable guide member 16. The other end of the lever 35 is pivotally connected to a threaded block 36. The threaded block 36 is in threaded engagement with a screw shaft 38 which is rotated by a motor 37. Accordingly, the guide member 16 pivots about the pin 17 in response to the rotation of the motor 37. The pawl 34, the movable guide member 16 and the pivoting mechanism (35, 36, 37 and 38) for the member 16 constitute in combination a cassette opening and closing mechanism 40, as will be clear from the description of the operation of the invention which will be made later.

The cassette supporting means 13 further includes a crank arm 44 which is pivoted by a combination of a motor 41, a worm 42 and a worm wheel 43. A crank pin 45 is provided at the distal end of the arm 44 in such a manner that the crank pin 45 is fitted in a vertically elongated slot 46 provided in a side wall of the housing 1. Accordingly, when the crank arm 44 pivots in response to the rotation of the motor 41, the cassette supporting means 13 as a whole is pivoted, whereby the means 13 is able to assume a first position (shown in FIG. 6) where the film 11 is to be released from the cassette 5 and a second position (shown in FIG. 1) where the film 11 is to be loaded into the cassette 5.

Figure 5:
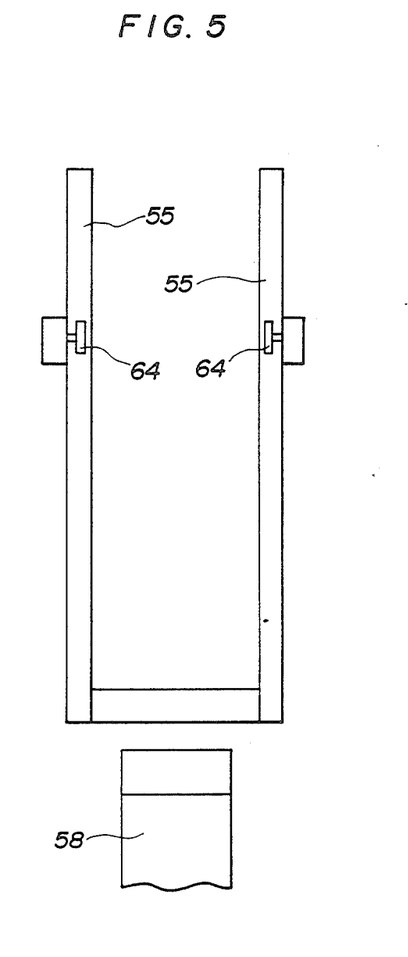
FIG. 5 shows a part of the apparatus illustrated in FIG. 1, as viewed in direction of the arrow A.

A film chute 47 is formed below the cassette supporting means 13 so that the chute 47 faces the cassette accommodating passage 21 when the cassette supporting means 13 is in the first position. The film chute 47 communicates with an exposed film chamber 48 into which the film 11 drops by gravity so as to be accommodated in a vertical position. An unexposed film chamber 49 is formed adjacent to the exposed film chamber 48, the chamber 49 accommodating unexposed films in a vertical position. The unexposed film chamber 49 is provided with an outlet opening 51 through which a suction pad 53 of a film transporting means 52 is able to enter the chamber 49 in order to take out the unexposed films one by one with a suction-holding action. Since the unexposed films are vertically accommodated in the chamber 49, a space exists between each pair of adjacent films, so that it is possible to reliably take out the films one by one without any risk of the films adhering to each other. The film transporting means 52 is movable vertically so that it is able to feed the film thus taken out into the area between a pair of rails 55 which constitute a guide rail means 54. The means 54 is vertically movable by the action of a chain 57 which extends between a pair of sprockets 56. A lifter 58 is provided below the guide rail means 54. The lifter 58 is also vertically movable by the action of a chain 62 which extends between a pair of sprockets 61. The lifter 58 is engageable with the lower edge of the film interposed between the rails 55 so that the lifter 58 is able to push up the film relative to the rails 55. The guide rail means 54 is provided with pinch rollers 64 associated with the rails 55, respectively. The pinch rollers 64 are combined with a known one-way clutch in such a manner that the film held between the pinch rollers 64 is allowed to move upward relative to the rails 55 but prevented from moving downward. The pinch rollers 64 may be omitted if the arrangement is such that a frictional force which is small but sufficient to prevent the lowering of the film is produced between the film and the rails 55. The positional relationship between the guide rail means 54, the film transporting means 52 and the lifter 58 will be more apparent on making specific reference to FIG. 5, which shows a part of the apparatus as viewed in direction of the arrow A in FIG. 1.

Auxiliary shutters 66 are provided below the cassette supporting means 13 so that, when the shutter 3 is open, the films accommodated in the film chambers 48 and 49 are prevented from being exposed to ambient light. These auxiliary shutters 66 are, however, not necessary for an arrangement wherein the cassette supporting means 13 is able to prevent any light entering the housing 1 through the slot 2 from reaching any part of the apparatus below the means 13.

The automatic X-ray film changing apparatus is further provided with a control means 65 which is schematically illustrated. Each of the actuating portions of the apparatus is controlled by the control means 65 as follows.

When the apparatus is in the state shown in FIG. 1, the cassette suppporting means 13 is in the second position, and the shutter 3 is open. In this set of conditions, a closed cassette is inserted into the apparatus and supported on the gripping portion 23 of the cassette clamping member 22. When the existence of this cassette is sensed by the sensor 31, the motor 29 is started and operates to lower the gripping member 22, thereby accommodating the cassette within the cassette accommodating passage 21. At this time, the shutter 3 is closed and, thereafter, the shutters 66 are opened. Then, the unlatching means 33 is actuated so as to cause the pawl 34 to engage with the latch knob 8 (see FIG. 2), thereby unfastening the latch, and thus allowing the cassette to be opened.

Figure 6:
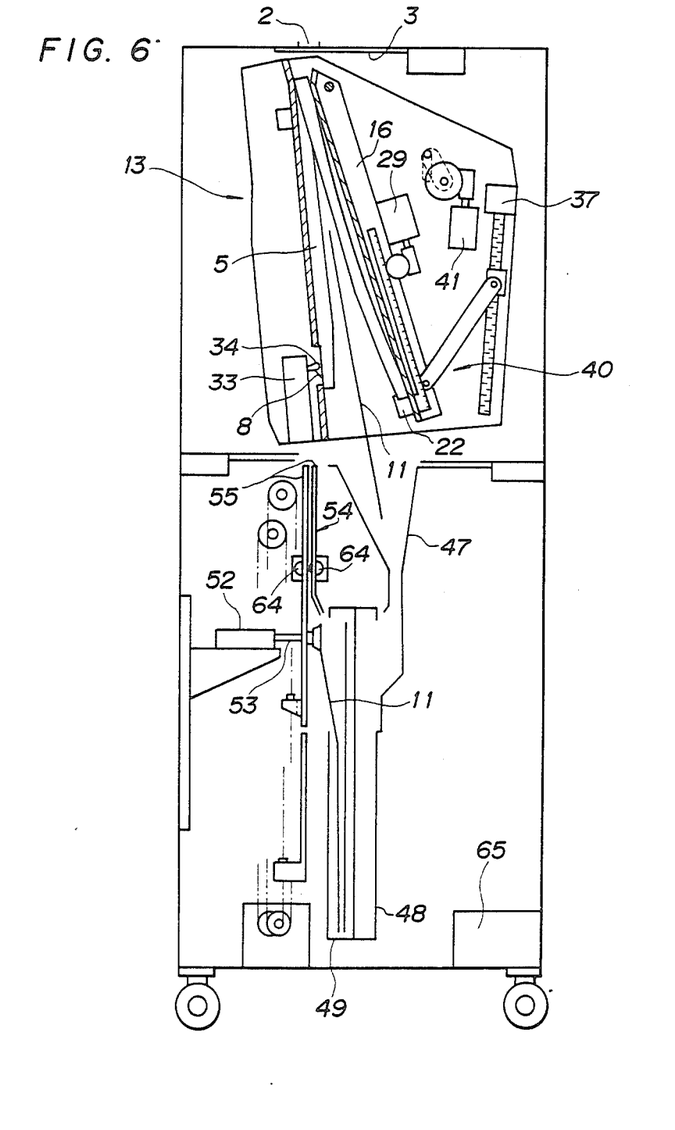
FIGS. 6 and 7 are vertical sectional side views of the apparatus illustrated in FIG. 1, which respectively show the apparatus in successive operating positions.

Then, the motor 41 is rotated to cause the cassette supporting means 13 as a whole to pivot to the first position as shown in FIG. 6. At the same time, or after an appropriate period of time has elapsed, the motor 37 is started and rotates to pivot the movable guide member 16, thus opening the cassette 5. Accordingly, the film 11 is allowed to drop into the film chute 47 when the cassette supporting means 13 is in the first position.

The film transporting means 52 is activated at any time before or after the pivoting operation of the cassette supporting means 13, whereby one unexposed film 11 is taken out of the film chamber 49 by the action of the suction pad 53 (see FIG. 6). The film transporting means 62 is then moved upwardly to raise the film 11 through the area between the rails 55 until the film 11 is held between the pinch rollers 64. Thereafter, the fillm transporting means 52, i.e., the suction pad 53, separates from the film 11. At this time, however, there is no risk of the film 11 dropping, thanks to the aforementioned operation of the pinch rollers 64.

Figure 7:
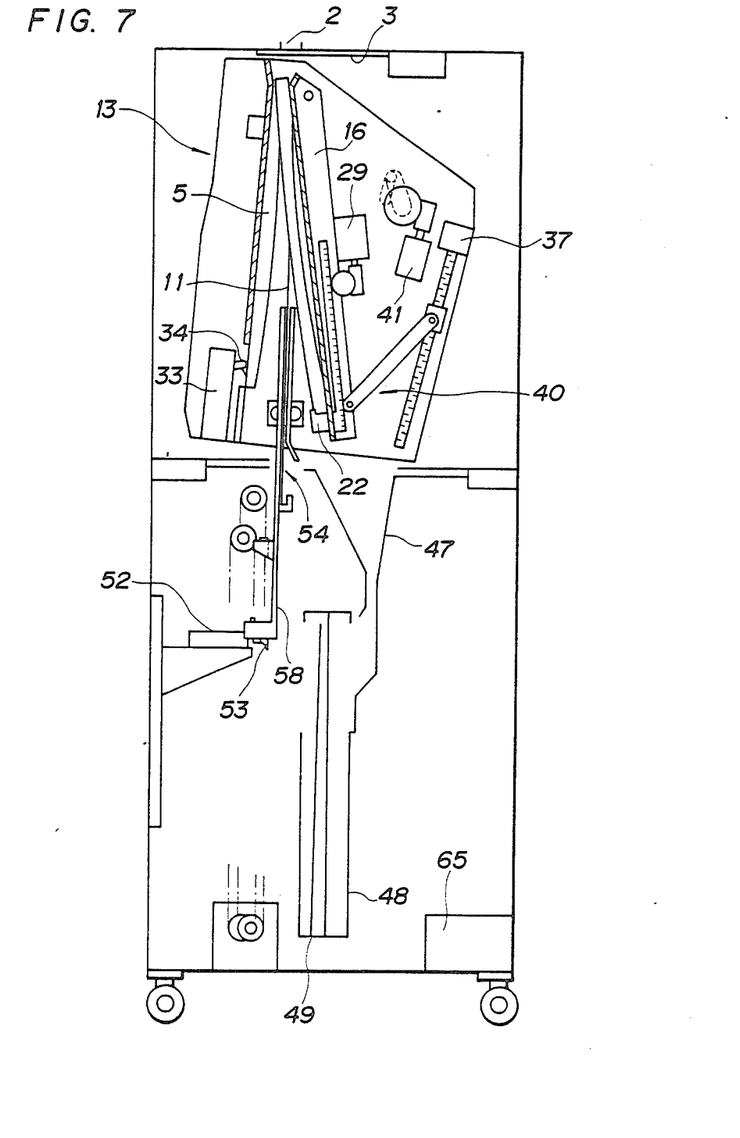

After the exposed film 11 has dropped into the film chute 47 when the cassette supporting means 13 is in the first position, the supporting means 13 returns to the second position with the movable guide member 16 held in the open state (see FIG. 7). It is to be noted that a sensor may additionally be provided at the film chute 47 for the purpose of confirming that the film 11 has dropped. When the supporting means 13 has returned to the second position, the guide rail means 54 enters the inner side of the cassette 5 while supporting the unexposed film 11. At the same time as the guide rail means 54 moves upward, or after an appropriate period of time has elapsed thereafter, the lifter 58 moves upward to push up the lower edge of the film 11 so that the film 11 rises relative to the rails 55 until it reaches a predetermined position within the cassette 5. Then, the motor 37 is activated and, in response to the rotation of the motor 37, the movable guide member 16 starts to pivot in the direction to close the cassette 5. When the cassette 5 is closed to a predetermined position, the film 11 is clamped by the cassette 5 solely at the upper portion thereof, as described above. In this state, the guide rail means 54 and the lifter 58 leave the film 11 and are lowered to their respective home positions. Consequently, the guide rail means 54 and the lifter 58 do not interfere with the closing movement of the cassette 5. As the motor 37 is further rotated, the cassette 5 is brought into a completely closed state. Subsequently, the operation of the unlatching means 33 is cancelled and, after the shutters 66 have been closed, the shutter 3 is opened. The gripping member 22 then moves upward, thus allowing the cassette 5 to be taken out of the apparatus. At this time, it becomes possible to insert a subsequent cassette.

Figure 8:
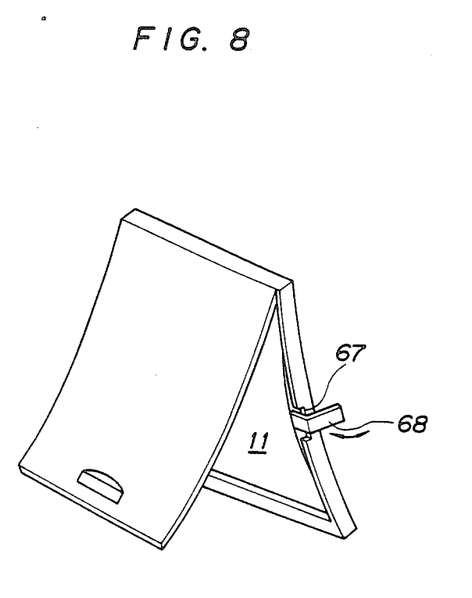
FIG. 8 is a perspective view of means for facilitating the unloading of a film from a film cassette such as that shown in FIG. 2.

In the case of a cassette which is constituted by two curved halves as described above, the film 11 gradually comes in contact with the cassette walls from the upper portion thereof. For this reason, air is forced out of the areas between the film 11 and the cassette walls (or the sensitizing paper attached to the cassette walls), so that they may be brought into full contact with each other and stick together. In such a case, the film 11 may become unable to drop from the cassette 5 by gravity. Therefore, when such a cassette is used, a notch 67 is provided at one side edge thereof as shown in FIG. 8, and a pressing piece 68 is provided on the cassette supporting means 13 so that the distal end of the pressing piece 68 is able to enter the cassette through the notch 67. The pressing piece 68 is caused to pivot as shown by the arrows whereby one side edge of the film 11 accommodated in the cassette is pressed inwardly so as to be deflected, thus causing the film 11 to drop easily.

As has been described above, it is possible, according to the present invention, to change films while accommodating the cassette in the apparatus in a substantially vertical position. In addition, it is possible to unload an exposed film from the cassette by making use of the gravitational effect. Therefore, the space which is occupied by the film changing apparatus in the horizontal direction is reduced, and the film changing mechanism thereof is simplified, so that it is possible to greatly reduce the size of the apparatus as a whole.

Although the present invention has been described through specific terms, it is to be noted that the embodiment described is not exclusive and various changes and modifications may be imparted thereto without departing from the scope of the invention which is limited solely by the appended claims.

What is claimed is:

1. An apparatus for changing X-ray films of cassettes each of which has two halves hinged together at respective ends thereof, each of the cassettes being open after one of the two halves is moved away from the other of the two halves about the hinged respective ends thereof, each of the cassettes being closed to contain an X-ray film therein when said one of the two halves covers the other of said two halves, and each of the cassettes having securing means for securing an X-ray film therein when the cassette is in a state that is not completely closed, said apparatus comprising:

a housing having a slot extending therethrough at the top thereof through which one of the cassettes is inserted when changing an X-ray film contained therein, and a shutter mounted within the housing adjacent said slot, the shutter being movable relative to said housing for opening and closing said slot;

a cassette supporting means within said housing for supporting the cassette in a vertical orientation with said hinged ends thereof up after the cassette is inserted through said slot into said housing, said cassette supporting means pivotally mounted to said housing for pivoting between a first position at which the cassette remains disposed in a generally vertical orientation and at which an exposed X-ray film within the cassette is discharged therefrom by falling out of the cassette when the cassette is open and a second position at which an unexposed X-ray film is loaded into the cassette, said cassette supporting means having a cassette opening and closing means for engaging both of said halves of said cassette to open and close the cassette;

an exposed film chamber within said housing and below said cassette supporting means for containing exposed X-ray films that have respectively fallen from ones of the cassettes;

a film chute within said housing between said cassette supporting means and said exposed film chamber for guiding an exposed X-ray film falling from the open cassette supported by said cassette supporting means at said first position to the exposed film chamber;

an unexposed film chamber within said housing and below said cassette supporting means for containing unexposed X-ray films to be fed to the cassette supported by said cassette supporting mans at said second position;

vertical guide rail means movably mounted within said housing and extending between said unexposed film chamber and said cassette supporting means, and transporting means for moving said guide rail means between a first position adjacent said unexposed film chamber and a second position at which the guide rail means extends into the open cassette supported by said cassette supporting means at said second position thereof;

film transporting means within said housing having a suction pad for transferring an unexposed X-ray film from said unexposed film chamber to said guide rail means when said guide rail means is at said first position thereof;

a lifter movably mounted within said housing for raising an unexposed X-ray film along and relative to said guide rail means until an upper portion of the unexposed X-ray film extends beyond the top of the guide rail means; and control means for controlling said cassette supporting means to pivot to said first position thereof after a cassette is supported thereby and for causing said cassette opening and closing means to open said cassette so that an unexposed X-ray film contained therein falls into said film chute and is guided thereby into said exposed film chamber, for subsequently controlling the cassette supporting means to pivot to said second position, for controlling the film transporting means to transfer an unexposed X-ray film from said unexposed film chamber to said guide rail means, for subsequently controlling said transporting means to raise said guide rail means to said second position thereof to move the guide rail means into the cassette, for controlling said lifter to move an unexposed X-ray film into said cassette, for controlling said cassette opening and closing means to close the cassette thereby securing the unexposed X-ray film to and within the cassette with the securing means as the cassette is closed, and for controlling said transporting means to lower the guide rail means after said unexposec X-ray film is secured to the cassette before the cassette is completely closed.

2. An apparatus as claimed in claim 1, wherein said guide rail means includes a pair of pinch rollers for pinching the unexposed X-ray film fed to the guide rail means by said film transporting means; and a one-way clutch operatively connected to said pinch rollers for preventing said pinch rollers from rotating in a direction in which the unexposed X-ray film pinched thereby would move downward relative to said guide rail means.

3. An apparatus as claimed in claim 1, wherein said guide rail means include a pair of guide rails which are spaced relative to one another by a predetermined distance, said film transporting means transporting unexposed X-ray film between said pair of guide rails, said distance being of such a magnitude relative to the dimensions of the unexposed X-ray film that said guide rails frictionally engage the unexposed x-ray film with a frictional force which allows the unexposed X-ray film to be moved upwardly relative to the guide rails by said lifter.

4. An apparatus for changing X-ray films of cassettes each of which has two halves hinged together at respective ends thereof, each of the cassettes being open after one of the two halves is moved away from the other of the two halves about the hinged respective ends thereof, each of the cassettes being closed to contain an X-ray film therein when said one of the two halves covers the other of said two halves, and each of the cassettes having securing means for securing an X-ray film therein when the cassette is in a state that is not completely closed, said apparatus comprising:

a housing having a slot extending therethrough at the top thereof through which one of the cassette is inserted when changing an X-ray film contained therein, and a shutter mounted within the housing adjacent said slot, the shutter being movable relative to said housing for opening and closing said slot;

a cassette supporting means within said housing for supporting the cassette in a vertical orientation with said hinged ends thereof up after the cassette is inserted downwardly through said slot into said housing, said cassette supporting means pivotally mounted to said housing for pivoting between a first position at which the cassette remains disposed in a generally vertical orientation and at which an exposed X-ray film within the cassette is discharged therefrom by falling out of the cassette when the cassette is open and a second position at which an unexposed X-ray film is loaded into the cassette, said cassette supporting means having a cassette opening and closing means for engaging both of said halves of said cassette to open and close the cassette;

an exposed film chamber within said housing and below said cassette supporting means for containing exposed X-ray films that have respectively fallen from ones of the cassettes, a film chute within said housing between said cassette supporting means and said exposed film chamber for guiding an exposed X-ray film falling from the open cassette supported by said cassette supporting means at said first position to the exposed film chamber;

an unexposed film chamber within said housing and below said cassette supporting means for containing unexposed X-ray films to be fed to the cassette supported by said cassette supporting mans at said second position;

film transporting means within said housing between said unexposed film chamber and said cassette supporting means for transferring an unexposed X-ray film from said unexposed film chamber to the open cassette supported by said cassette supporting means at said second position thereof; and control means for controlling said cassette supporting means to pivot to said first position thereof after a cassette is supported thereby and for causing said cassette opening and closing means to open said cassette so that an exposed X-ray film contained therein falls into said film chute and is guided thereby into said exposed film chamber, for subsequently controlling the cassette supporting means to pivot to said second position, for controlling the film transporting means to transfer an unexposed X-ray film from said unexposed film chamber to said open cassette supported by said cassette supporting means at said second position, and for controlling said cassette opening and closing means to close the cassette thereby securing the unexposed X-ray film to and within the cassette with the securing means as the cassette is closed.

* * * * *